Figure 1:
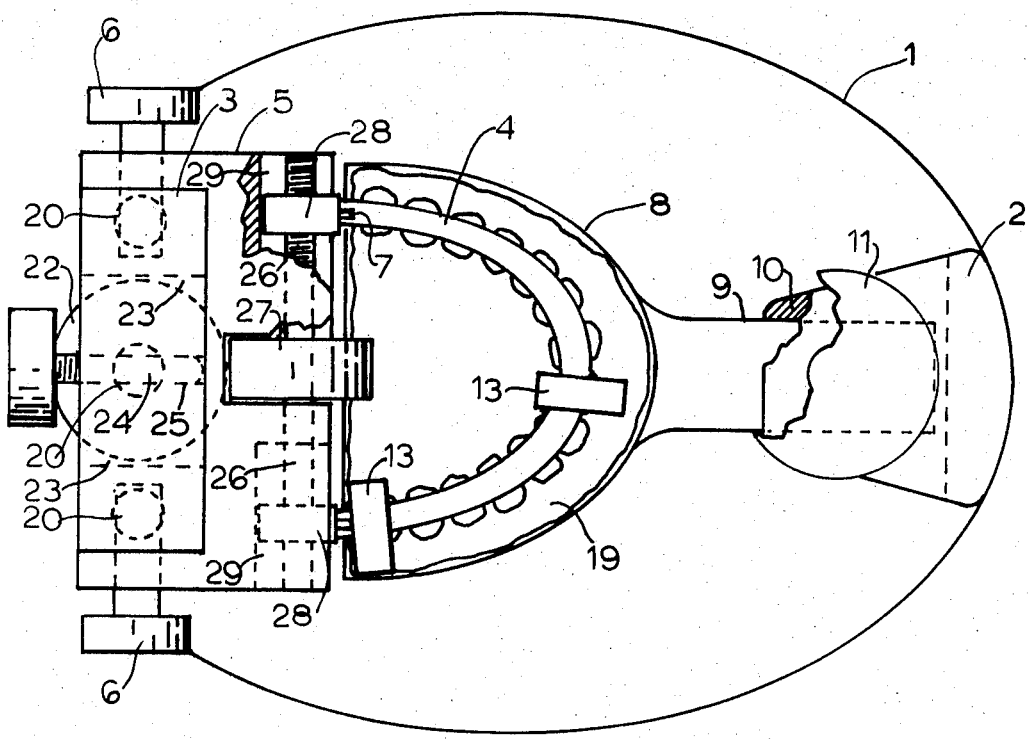

United States Patent [19]

Tinder

[11] 3,832,777
[45] Sept. 3, 1974

[54] DENTAL RESTORATION JIG

[76] Inventor: Lawrence E. Tinder, 2900 Sawmill Gulch Rd., Pebble Beach, Calif. 93953

[22] Filed: Mar. 13, 1973

[21] Appl. No.: 340,937

[52] U.S. Cl. .................................................. 32/11
[51] Int. Cl. ............................................ A61c 13/00
[58] Field of Search ................................. 32/11, 32

[56] References Cited
UNITED STATES PATENTS
2,234,411  3/1941  McDonald .......................... 32/11 X
3,277,576  10/1966  Kraft ................................. 32/40 R

*Primary Examiner*—Robert Peshock
*Attorney, Agent, or Firm*—Lynn G. Foster

[57] ABSTRACT

A flexibly positioned dental die pin setter with removable die pin holder handles in vertically swivelable relationships to the top of an impression tray holder that is adjustably attachable to a base with a vibrating member.

8 Claims, 2 Drawing Figures

PATENTED SEP 3 1974          3,832,777

DENTAL RESTORATION JIG

This invention relates to a die pin setter jig which secures dowel pins in spacially positionable relationship to prepared teeth as recorded in an elastic impression material for the construction of individual removable dies used in the fabrication of dental inlays, crowns, and fixed bridges.

In restorative dentistry, teeth are prepared to particular configurations prior to the application and shaping of various materials to restore form and function to the teeth. In the indirect technique, an impression is made with an elastic material of at least the prepared teeth and a cast is made of the impression forming a replica of the prepared teeth in die stone. Individual dies are made by placing die pins in the die stone within the tooth impressions. Die pins serve as a convenience for holding individual dies while a "wax-up" of the tooth is being made and they serve as a means of repositioning individual dies in the cast.

In the prior art such a pin is usually placed in a tooth impression in substantially a perpendicular relationship to the plane on which the impression rests. When so positioned, the pin is not necessarily oriented with respect to the tooth axis but does provide a direct tooth relationship when the stone model is cut and separated to facilitate the "wax-up" of the tooth. It has been attempted to provide proper orientation of a pin in an impression by a device in which the pin, in effect, is universally mounted on a support member or imbedded in plastic material arranged over the impression so that proper orientation of the pin is attained. These types of devices present not only a time consuming operation, but the releasing and resetting operations are difficult to perform with any efficiency or accurate orientation of the pin.

SUMMARY OF THE INVENTION

The primary object of the present invention is to provide a device for permitting the instantaneous and accurate setting of a die pin with respect to the axis of a tooth cavity in an impression.

Another object is to utilize presently available and inexpensive saliva ejectors as the flexibly adjustable portion of the die pin setter jig.

Another object of the invention is to provide a die pin holder that can be used as a convenient handle that is easily and accurately attachable to an adjustably positionable die pin setter.

These and other objects and advantages to the invention will be apparent to those skilled in the art from the following description.

Figure 2:
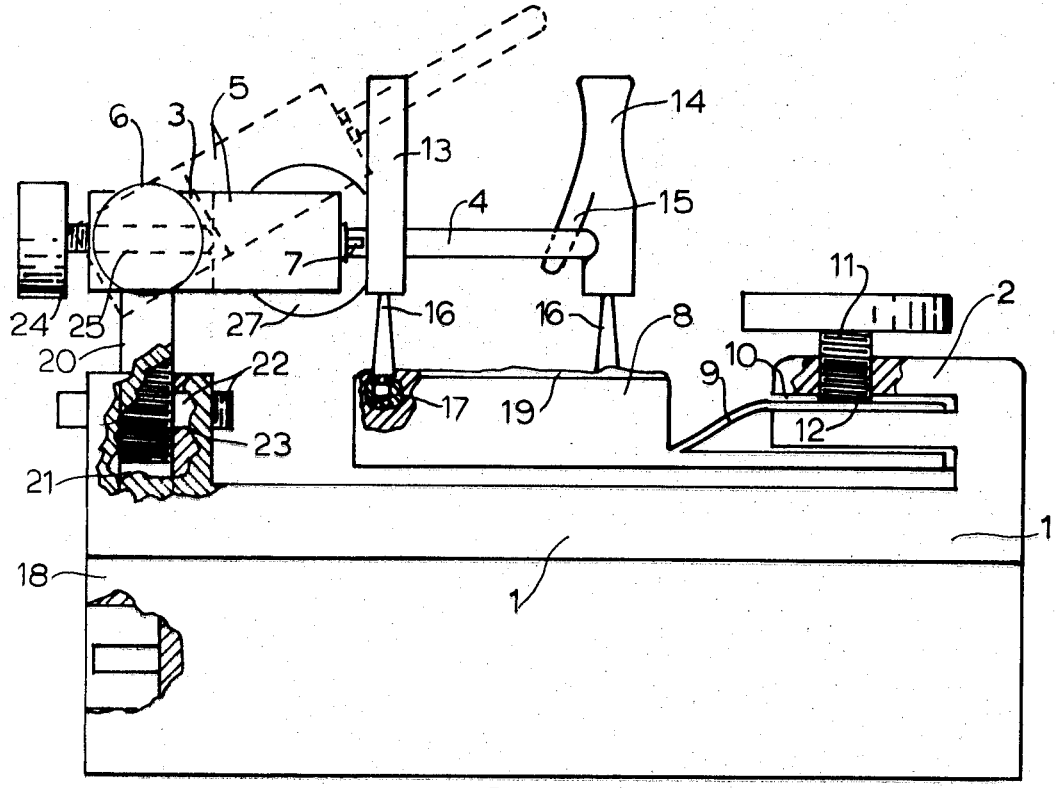

This invention is described in relation to the accompanying drawings wherein:

FIG. 1 is a plan view.
FIG. 2 is a side view.

A base member 1 is provided with a dental impression tray holder clamp 2 and a jig mount 3 with moldably flexible die pin setter member 4.

A preferred form of the invention is provided with a vertically swivelable jig mount 5 to allow the flexible die pin setter to be rotated to a substantially vertical position for removing the die pin holder or for working on the die while it is held in place for accurate repositioning. The die pin holder would be in a substantially horizontal position for ease of observation and accessability when the swivelable jig mount is rotated to a vertical position. Knobs 6 are provided for ease in rotating the swivelable jig mount to a vertical position.

Convenient, readily available and inexpensive moldably flexible members that can be utilized in this invention are saliva ejectors that are common to the industry. They are pencil-sized plastic tubes with moldable, non-spring metal members embedded in their walls.

Mounting pins 7 are provided in the jig mount for holding the saliva ejectors or other flexible and moldable members. A tight-fitting of the flexible members onto the pins is sufficient to hold them.

Rubber-base impression tray holders can be placed on the base between the tray holder clamp and the jig mount.

A hydrocolloid tray holder 8 can be held in adjustable position by insertion of a handle 9 thereof into slot 10 in the impression tray holder clamp. The slot allows horizontal movement of the handle. A clamp bolt 11 is provided in vertical position above the tray handle and can be turned to cause its threaded end 12 to hold the tray handle rigidly.

A die pin holder 13 is provided with a handle 14 and a clamping means 15. The use of relatively rigid plastic material with relative spring-type characteristics for a holder makes clamp and handle features possible in one piece. It is convenient to work with and inexpensive to produce in this form. A die pin 16 is inserted in one end of the holder and dental dies 17 are attached to the die pin.

A vibrator with an electrical connection shown in cutaway is mountable beneath the base. It provides a convenient means of settling die stone 19 in an impression tray without having to remove the impression tray, to disturb the jig setting, to attach or hold a vibrator in contact with the impression tray, or to reach for and assemble a vibrator with the jig.

An additionally advantageous form of this invention features a vertically adjustable jig mount. This can be accomplished by extending three jig rods 20 from the jig mount into jig rod orifices 21. The center jig rod is threaded and extended through a vertical adjuster nut 22 that is held vertically and on two sides in vertical adjuster nut slot 23 in the base member or an extension or attachment thereof.

The jig mount can be held in varying degrees of incline by a threaded incline adjuster bolt 24 that is screwed into an incline adjuster bolt hole 25 at varied depths. This causes the incline adjuster bolt to hold the vertically swivelable jig mount in an inclined condition as illustrated in a dotted line portion of FIG. 2.

The attachment of the moldably flexible die pin setter member can be made adjustable in width to accomodate differing jaw widths. This is done by having a width adjustment bolt 26 threaded oppositely on one side from the other and solidly attached to a centrally positioned width adjustment nut 27. Attachment pin base members 28 for the pins that secure the flexible member are provided with inside diameters that are threaded to match the width adjustment bolt threads. The attachment pin base members are placed in adjustment slots 29 where they are caused to slide simultaneously inwardly or outwardly when the width adjuster nut is turned in respectively different directions.

A convenient and inexpensive means has thus been provided for the multiple dental restoration functions of setting die pins, holding the die pins in a workable position without removing them from their setting jig, returning removed die pins to their setting accurately and conveniently if removed from the jig, holding rubber-base trays in relationship to the jig, holding hydrocolloid trays in adjustable position with respect to the jig, and providing vibratory action conveniently without upsetting the die pin setting.

I claim:

1. A dental restoration and die pin jig comprising:
    a base;
    means for receiving and holding a dental impression tray in substantially rigid condition above the base;
    a jig mount situated above the base;
    die pin setter means cantilever connected to and eccentric of the jig mount and adapted to project in a plane above the base;
    said die pin setter means comprising a one-piece curvilinear flexible tubular member of yieldable synthetic resinous material having memory and spaced selectively settable means, each joining one end of the tubular member to the jig mount such that adjustment of selectively settable means will change the arc of the tubular member into substantial correspondence in configuration to the arc formed by a dental impression;
    a plurality of die pin holders, each said holder comprising a bifurcation securing the holder in press fit releasable relation to the tubular member and means from which a die pin depends.

2. The jig of claim 1 further comprising means interposed between the base and the jig mount whereby the jig mount may be pivoted from a position where the die pin setter means is in said plane to a position where the die pin setter means is at least partially erect.

3. The jig of claim 1 wherein the tubular member comprises a length of hollow yieldable plastic tube arcuately spanning between the selectively settable means without intermediate support.

4. The jig of claim 3 wherein each die pin holder is of one-piece construction and wherein the bifurcation of each die pin holder comprises a folked section which is forced downwardly upon the plastic tube partially collapsing the tube and retaining each holder by the memory of the tube.

5. The jig of claim 1 wherein the jig mount comprises means for varying the distance between the selectively settable means for adjusting the location of the ends of the tubular member and thereby varying the curve defined by the tubular member.

6. The jig of claim 1 further comprising means interposed between the base and the jig mount whereby the elevation of the tubular member in respect to the base may be varied and secured.

7. The jig of claim 1 further comprising vibrator means in communication with the base whereby impression material is consolidated.

8. A die pin holder comprising a one-piece elongated clip having a major axis and three ends, the clip comprising:
    means at one end of the clip for receiving in depending generally axial relation at least one die pin;
    a body disposed central of the three ends comprising a bifurcated section defining an inverted Y, the apex region of which is adapted to be press fit over die pin setter means;
    a free normally upwardly directed end comprising a handle for manually gripping the clip to cause the clip to be placed in and removed from said press-fit relation with the die pin setter means.

* * * * *